United States Patent
Stark et al.

[11] 3,921,004
[45] Nov. 18, 1975

[54] VEHICLE SAFETY DEVICE

[76] Inventors: Pamela J. Stark, P.O. Box 18; James A. Stark, c/o Dexter Machine Company, 229 Burlington, both of Clarendon Hills, Ill. 60514

[22] Filed: July 29, 1974

[21] Appl. No.: 492,732

[52] U.S. Cl. ............... 307/10 R; 340/70; 200/61; 200/88; 180/82 R
[51] Int. Cl.² ............................................. H02J 1/02
[58] Field of Search ............................. 200/61–91; 180/82 R; 340/70; 307/10 R

[56] References Cited
UNITED STATES PATENTS
2,829,213   4/1958   Brett .................................. 200/61;88
3,475,618   10/1969  Wiesner ............................. 180/82 R

*Primary Examiner*—Herman J. Hohauser
*Attorney, Agent, or Firm*—Hume, Clement, Brinks, Willian, Olds & Cook, Ltd.

[57] ABSTRACT

A vehicle safety device for disconnecting noise-producing accessory devices from their power supply when the vehicle is shifted into reverse gear wherein a relay having a normally closed contact is provided. The accessory devices are electrically connected to the power supply through the relay contact. A means is also provided for opening the relay contact when the vehicle's reverse gear is engaged by its associated shifting mechanism, thereby breaking the electrical connection between the accessary devices and power supply.

9 Claims, 1 Drawing Figure

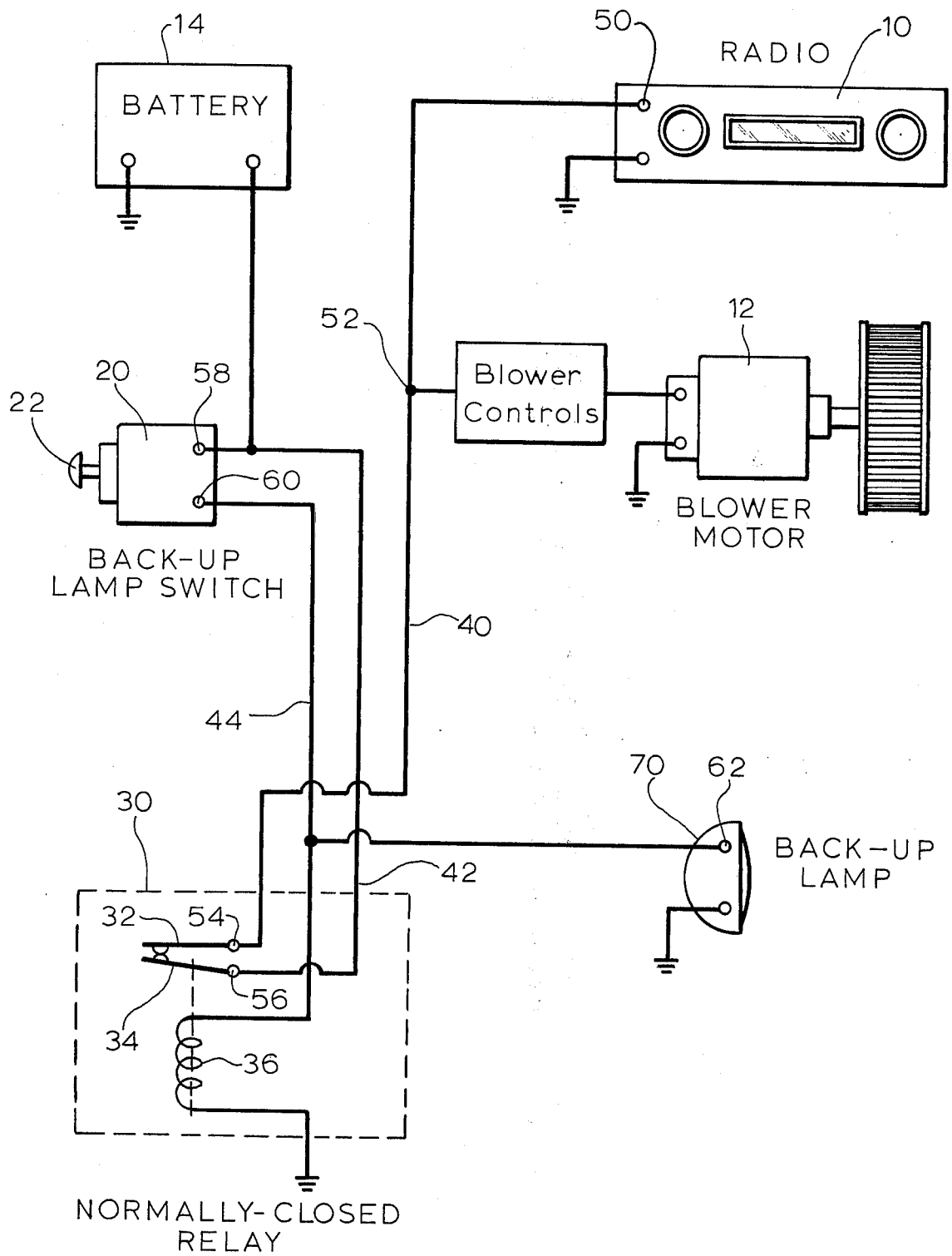

VEHICLE SAFETY DEVICE

INTRODUCTION

The present invention relates generally to a safety device for use with vehicles and, more particularly, to a device for breaking the electrical connection between an electrically powered accessory device in the vehicle and its power supply when the vehicle is shifted into reverse gear.

BACKGROUND OF THE INVENTION

It has been found that many noise-producing electrically powered accessory devices commonly found today in automobiles, trucks and the like may present a potentially dangerous safety hazard when the vehicle is traveling to the rear in reverse gear. The reason for this potential hazard is that noise-producing accessories, such as the radio and air conditioner blower, may tend to distract the driver during this critical period when normal road vision is greatly restricted. Therefore, the present invention has been developed to overcome this potential safety hazard and to allow utilization of the vehicle driver's sense of hearing to the maximum extent possible during this period.

The present invention is a relatively simple and inexpensive electrical circuit device for disconnecting such noise-producing accessory devices from their power supply when the vehicle is shifted into reverse gear. An additional desirable feature of the present inveniton is that it may be easily installed on most vehicles through utilization of existing back-up light switching systems, without interfering with the normal operation of the back-up light.

BRIEF DESCRIPTION OF THE INVENTION

In accordance with the present invention a relay having a normally closed contact is provided. The relay contact electrically connects the accessory device to its power supply. A means is also provided for opening the contact of the relay when the vehicle's reverse gear is engaged by its associated shifting mechanism. In this manner, the electrical connection between the accessory device and power supply is broken when the vehicle is shifted into reverse gear.

BRIEF DESCRIPTION OF THE DRAWINGS

The features of the present invention which are believed to be novel are set forth with particularity in the appended claims. The invention together with further advantages thereof may be best understood, however, with reference to the following description of the preferred embodiment taken in connection with the accompanying drawing, which is an electrical schematic diagram of a preferred embodiment of the present invention as employed in a vehicle.

DESCRIPTION OF THE PREFERRED EMBODIMENT

In the preferred embodiment of the invention, the means for opening the relay contact is the vehicle back-up lamp switch, which has a normally open contact that is mechanically closed when reverse gear is engaged. An electrical circuit connects the activating coil of the relay to the vehicle's power supply through the back-up lamp switch so that the relay contact is opened when the back-up lamp switch contact is closed as reverse gear is engaged. The opening of the relay contact results in the electrical connection between the accessory device and power supply being broken. In this manner all noise-producing accessory devices are automatically rendered inoperable whenever reverse gear is engaged.

Referring now to the drawing, conventional accessory devices such as radio 10 and air conditioner or heater blower motor and controls 12 are connected to their power supply, vehicle battery 14, through an embodiment of a safety device constructed in accordance with the present invention. The safety device circuit illustrated consists essentially of back-up lamp switch 20 and relay 30, both of which are of commercially available construction.

More specifically, electrical conductor 40 is connected at one end to terminals 50 and 52 on the radio and blower motor controls, and is connected at its other end to terminal 54 on one of the normally closed relay contact points 32. Conductor 42 connects terminal 56 of the other relay contact point 34 to battery 14. Conductor 42 is also connected to terminal 58 of back-up lamp switch 20. Back-up lamp switch 20 has a normally open contact between its terminals 58 and 60 which is of conventional construction and is not shown in the drawing. Conductor 44 completes the circuit of the present invention by connecting switch terminal 60 to relay activating coil 36.

In normal vehicle operation, relay contact points 32 and 34 are urged in a closed, electrically conductive position as is illustrated in the drawing. In this manner, the radio and blower motor are normally connected to the battery and, hence, are electrically operational under most driving conditions.

However, whenever the reverse gear of the vehicle is engaged, the associated shifting mechanism engages back-up lamp switch lever arm 22, which in turn closes the normally open contact of the switch. When the contact is so closed, switch terminals 58 and 60 are electrically connected and relay coil 36 is thereby activated. Activation of coil 36 creates a magnetic field which draws relay contact point 34 away from contact point 32, thereby breaking the electrical connection between the radio and blower motor and the battery. In this manner, the accessory devices are rendered inoperable when the vehicle is in reverse gear. However, whenever the vehicle is shifted out of reverse gear the back-up lamp switch contact is opened and the relay coil is deactivated, allowing the relay contact points to close and thereby automatically returning the accessory devices to normal operation.

Also illustrated in the drawing is back-up lamp 70 which is connected to conductor 44 at terminal 62. Since the back-up lamp 70 is connected to the same circuit that activates relay coil 36, and is in parallel therewith, it also is operated whenever the back-up light switch contact is closed by the reverse gear shifting mechanism.

While a particular embodiment of the present invention has been shown and described, it should be understood that various changes and modification thereto may be made, and it is therefore intended in the following claims to include all such modifications and changes as may fall within the true spirit and scope of this invention.

What is claimed is:

1. A safety device for use with vehicles having a reverse gear and associated shifting mechanism and having an electrically powered noise producing accessory device connected to a power supply, said safety device comprising:
  a relay having a normally closed contact electrically connecting the accessory device to the power supply,
  means for opening the contact of said relay when the reverse gear is engaged by its associated shifting mechanism whereby the electrical connection between said accessory device and power supply is broken.

2. The safety device of claim 1 wherein said relay contact opening means comprises:
  a switch having a normally open contact,
  means for closing the contact of said switch when the reverse gear is engaged by its associated shifting mechanism,
  means for electrically operating said relay whereby said relay contact is opened when said switch contact is closed.

3. The safety device of claim 2 wherein said electrical relay operating means comprises an electrical circuit connecting the activating coil of said relay to said power supply through said switch contact.

4. The safety device of claim 2 wherein said switch contact closing means comprises a lever arm mechanically engaging said switch contact with said shifting mechanism.

5. The safety device of claim 2 wherein said switch is a back-up lamp switch.

6. The safety device of claim 5 further comprising a back-up lamp connected in parallel with said relay.

7. The safety device of claim 1 wherein said electrically powered accessory is a radio.

8. The safety device of claim 1 wherein said electrically powered accessory is a radio and air conditioner blower motor.

9. A safety device for use with vehicles having a reverse gear and associated shifting mechanism and having a radio connected to a battery, said safety device comprising:
  a back-up lamp switch having a normally-open contact,
  means for closing the contact of said switch when the reverse gear is engaged by its associated shifting mechanism,
  a relay having a normally closed contact electrically connecting the radio to the battery, and
  an electrical circuit connecting the activating coil of said relay to said battery through said switch contact whereby said relay contact is opened when said switch contact is closed when the reverse gear is engaged, thereby breaking the electrical connection between said radio and battery.

* * * * *